United States Patent
Kakutani (10) Patent No.: US 8,861,033 B2
(45) Date of Patent: Oct. 14, 2014

(54) PRINTING SYSTEM

(71) Applicant: Seiko Epson Corporation, Tokyo (JP)

(72) Inventor: Toshiaki Kakutani, Nagano (JP)

(73) Assignee: Seiko Epson Corporation, Tokyo (JP)

(*) Notice: Subject to any disclaimer, the term of this patent is extended or adjusted under 35 U.S.C. 154(b) by 64 days.

(21) Appl. No.: 13/684,962

(22) Filed: Nov. 26, 2012

(65) Prior Publication Data

US 2013/0135684 A1 May 30, 2013

(30) Foreign Application Priority Data

Nov. 30, 2011 (JP) ................. 2011-262661

(51) Int. Cl.
*G06K 15/00* (2006.01)
*H04N 1/405* (2006.01)
*H04N 1/409* (2006.01)

(52) U.S. Cl.
CPC ............. *H04N 1/405* (2013.01); *H04N 1/4092* (2013.01)
USPC ....................................... 358/3.06

(58) Field of Classification Search
None
See application file for complete search history.

(56) References Cited

U.S. PATENT DOCUMENTS

| 5,420,971 | A  | * | 5/1995  | Westerink et al. | ............ 382/199 |
| 7,612,911 | B2 | * | 11/2009 | Kakutani         | ............ 358/1.9 |
| 7,813,007 | B2 |   | 10/2010 | Kakutani         |                      |
| 2004/0179745 | A1 | * | 9/2004 | Breeuwer et al.  | ............ 382/243 |

FOREIGN PATENT DOCUMENTS

| JP | 2004-289274 A | 10/2004 |
| JP | 2006-005899 A | 1/2006  |

* cited by examiner

*Primary Examiner* — Marivelisse Santiago Cordero
*Assistant Examiner* — Michael Burleson
(74) *Attorney, Agent, or Firm* — Global IP Counselors, LLP (57) ABSTRACT

A host computer generates pseudo-pixels by grouping pixels together. RGB representative values are assigned to the pseudo-pixels, which are then transferred to a printer. Meanwhile, for pixels that configured pseudo-pixels having an edge strength selected so that the transfer data amount is less than or equal to a predetermined value, the host computer carries out a halftone process and then transfers the dot data generated as a result to the printer. The printer then prints based on the transferred dot data and the representative values.

7 Claims, 6 Drawing Sheets

PRINTING SYSTEM

BACKGROUND

1. Technical Field

The present invention relates to printing systems.

2. Related Art

Printing devices typically print based on data indicating whether or not to form a dot for each pixel (dot data). Dot data is normally generated by converting image data of the RGB format. The greater the resolution of the image, the longer this conversion takes.

Accordingly, a technique is known that reduces the amount of time required for conversion by grouping a plurality of pixels together and carrying out a process based on whether or not an edge is present within the group. The "edge" mentioned here refers to a border line produced as a result of a sudden change in color, brightness, or the like. With this technique, groups that have an edge are converted normally, whereas the information in groups that do not have an edge is compressed, after which the conversion is carried out. This conversion is normally executed by a host device (a computer) that communicates with the printer. The dot data generated through the conversion is transferred from the host device to the printer as data for printing. The printer then prints based on the transferred dot data (for example, see JPA-2004-289274).

The aforementioned past technique attempted to both reduce the amount of time required to transfer data for printing to the printer and suppress a drop in the printing quality. Recently in particular, increases in the speed with which host devices convert dot data, increases in the speed with which line printers transport paper, and so on have resulted in a situation in which the time required for transferring data from a host device to a printer is a determining factor in the printing process. Accordingly, reducing the time of the data transfer has been an issue. Of course, a reduction in the data transfer time can easily be realized by reducing the resolution, but doing so will result in an equivalent drop in image quality. Accordingly, both reducing the amount of time required to transfer data for printing to the printer and suppressing a drop in the printing quality has been an issue.

SUMMARY

Having been conceived in order to solve at least one of the aforementioned problems, the invention can be implemented as the following aspects or application examples.

APPLICATION EXAMPLE 1

A printing system including a host device and a printer that executes printing using dot data indicating whether or not to form a dot for each pixel. The host device has: a pseudo-pixel generation unit that generates a pseudo-pixel by grouping together a plurality of pixels; an edge strength classification unit that classifies the pseudo-pixel into one of a plurality of segments according to an edge strength of the pseudo-pixel; a lower limit strength selection unit that selects a lower limit edge strength based on a result of the classification performed by the edge strength classification unit; a host halftone processing unit that generates the dot data based on pixels contained in a pseudo-pixel having an edge strength greater than or equal to the lower limit edge strength selected by the lower limit strength selection unit; an assignment unit that assigns, to a pseudo-pixel that is not to be processed by the host halftone processing unit, a representative value reflecting a color specification value of each pixel contained in that pseudo-pixel; and a transfer unit that transfers, to the printer, the representative value assigned by the assignment unit and the dot data generated by the host halftone processing unit. The printer has: a printer halftone processing unit that generates the dot data by executing a halftone process on the representative value transferred from the host device; and a printing unit that executes printing based on the dot data generated by the printer halftone processing unit and the dot data transferred from the host device.

According to this printing system, it is possible to both reduce the amount of time required to transfer data for printing and suppress a drop in the printing quality. In this printing system, the pseudo-pixels on which halftone processing is not carried out by the host device are transferred not as dot data but as representative values. The representative values are data of pseudo-pixels that achieve lower resolutions by being configured of a plurality of pixels, and thus have a smaller data amount than dot data. Accordingly, the data transfer time can be reduced. Furthermore, the pseudo-pixels on which the halftone processing is not performed by the host device are selected in order from those with low edge strengths. A pseudo-pixel having a low edge strength does not result in a major difference in image quality whether that pseudo-pixel is printed as a representative value or is printed as color specification values for each pixel contained therein. Thus according to this printing system, it is possible to both reduce the amount of time required to transfer data for printing and suppress a drop in the printing quality.

Note that a "pseudo-pixel having a low edge strength" also includes a "pseudo-pixel that does not contain an edge". Representative values may or may not be assigned to pseudo-pixels that are to be processed by the host halftone processing unit.

APPLICATION EXAMPLE 2

In the printing system according to application example 1, it is preferable that the lower limit strength selection unit have: an estimation unit that estimates, for each of the plurality of segments, a data amount of the dot data generated based on the pixels contained in a pseudo-pixel having an edge strength greater than or equal to the lower limit of the segments; and a pre-selection unit that selects, as the lower limit edge strength, a lower limit strength of the segment having the highest data amount among the plurality of segments whose estimated data amounts are less than or equal to a predetermined amount.

According to this printing system, the data amount transferred by the transfer unit can be suppressed to less than or equal to a predetermined amount. Furthermore, unnecessary halftone processing can be eliminated. This unnecessary halftone processing refers to, for example, halftone processing on edge strengths that are less than the lower limit strength.

APPLICATION EXAMPLE 3

In the printing system according to application example 2, it is preferable that the estimation unit carry out the estimation based on the percentage of the number of all pseudo-pixels occupied by the pseudo-pixels of the respective plurality of segments.

According to this printing system, the data amount can be estimated with ease.

APPLICATION EXAMPLE 4

In the printing system according to application example 2 or 3, it is preferable that in the case where the data amount of the dot data is not less than or equal to the predetermined amount even when the segment among the plurality of segments that has the strongest lower limit strength is selected, the pre-selection unit select dot data that is based on the pixels contained in the pseudo-pixels of a segment having the strongest lower limit strength.

According to this printing system, in the case where an image having many strong edges is printed, the image quality can be prevented from dropping significantly.

APPLICATION EXAMPLE 5

In the printing system according to application example 1, it is preferable that the host halftone processing unit have: a pre-selection halftone processing unit that generates the dot data by executing a halftone process on the pixels contained in pseudo-pixels containing an edge; a measurement unit that measures, for each of the plurality of segments, a data amount of the dot data generated based on the pixels contained in pseudo-pixels having an edge strength greater than or equal to the lower limit of the segments; and a post selection unit that selects the dot data based on the pixels contained in the pseudo-pixels has edge strengths greater than or equal to the lower limit edge strength as the dot data to be transferred by the transfer unit, and the lower limit strength selection unit selects, as the lower limit edge strength, a lower limit strength of the segment having the highest data amount among the plurality of segments whose measured number of pseudo-pixels is less than or equal to a predetermined amount.

According to this printing system, the data amount can be accurately understood, after which the data amount transferred by the transfer unit can be suppressed to less than or equal to a predetermined amount. Note that "pseudo-pixels that contain an edge" may be all or some of the pseudo-pixels aside from "pseudo-pixels that do not contain an edge". The "pseudo-pixels that do not contain an edge" may be pseudo-pixels in which the plurality of pixels contained in that pseudo-pixel have the exact same color specification values, or may be pseudo-pixels in which the plurality of pixels contained in that pseudo-pixel do not have the exact same color specification values but have similar color specification values. The same method as the method for determining the edge strength or another method may be used for determining whether or not the color specification values are similar.

APPLICATION EXAMPLE 6

In the printing system according to application example 5, it is preferable that in the case where the data amount of the dot data is not less than or equal to the predetermined amount even when the segment among the plurality of segments that has the strongest lower limit strength is selected, the post selection unit select dot data that is based on the pixels contained in the pseudo-pixels of a segment having the strongest lower limit strength.

According to this printing system, in the case where an image having many strong edges is printed, the image quality can be prevented from dropping significantly.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

1. Printing System (FIG. 1, FIG. 2)

Figure 1:
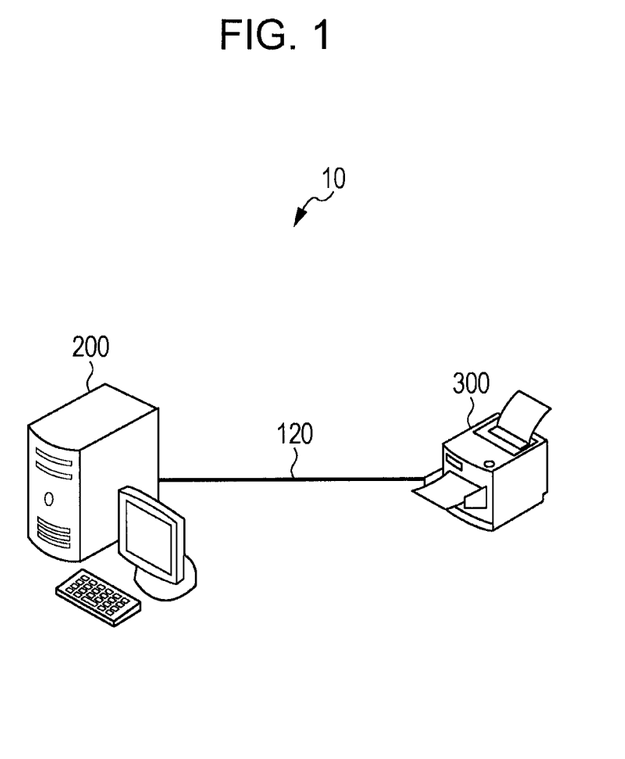
FIG. 1 illustrates the configuration of a printing system.

FIG. 1 is a diagram illustrating the configuration of a printing system 10. The printing system 10 includes a host computer 200 and a printer 300. The host computer 200 and the printer 300 are connected by a USB cable 120. The host computer 200 transfers data for printing (called "print image data" hereinafter) to the printer 300. The printer 300 prints an image onto a printing medium at a resolution of 1440×720 dpi based on the print image data transferred from the host computer 200. This print image data is data resulting from display image data being converted by a printer driver. The display image data is data for displaying an image in a display device 215 (described later with reference to FIG. 2) provided in the host computer 200. The display image data is RGB data having eight bits×three primary colors for each pixel, and has a resolution of 720×720 dpi.

Figure 2:
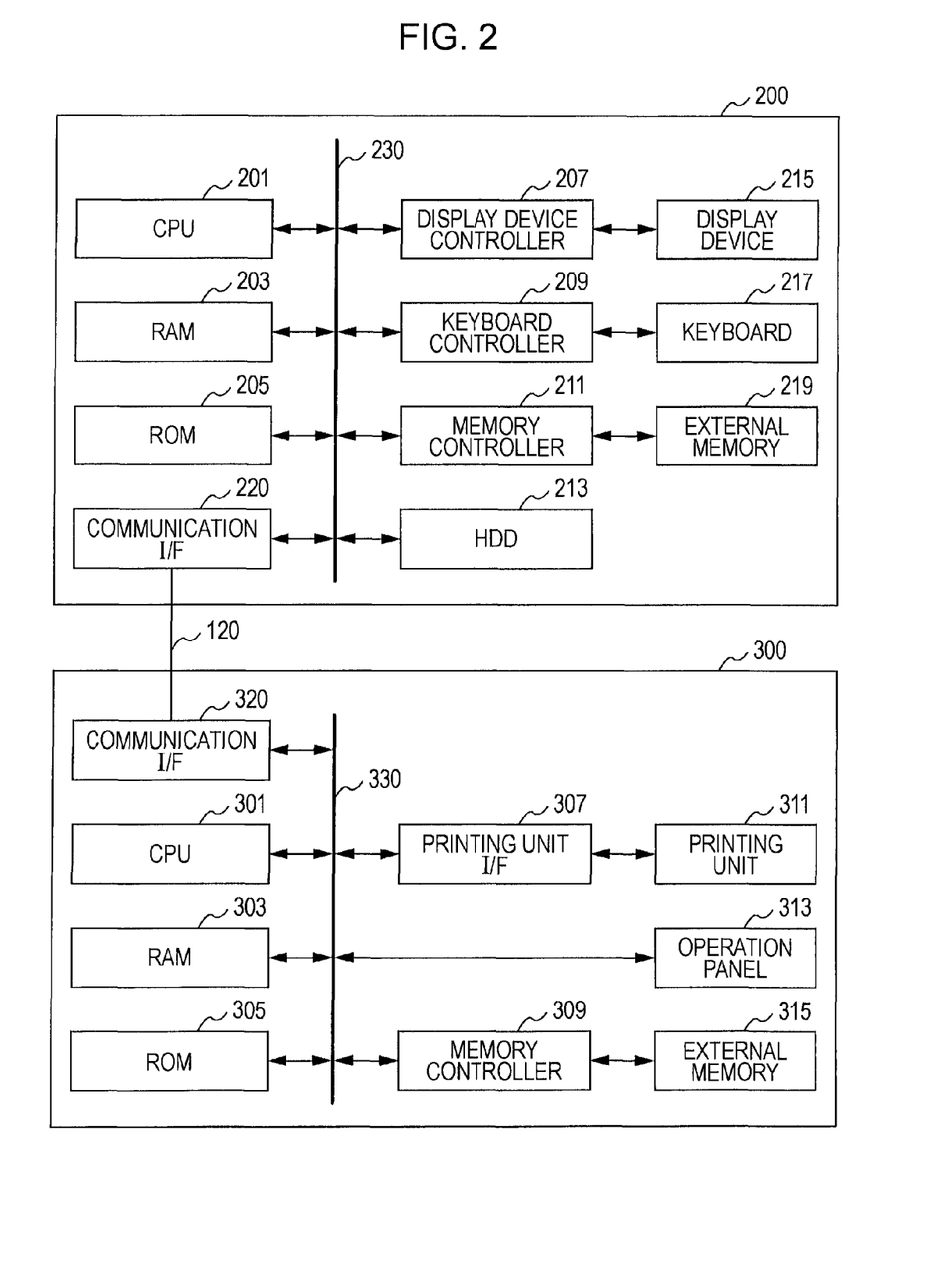
FIG. 2 illustrates the configuration of a host computer and a printer.

FIG. 2 is a diagram schematically illustrating the configuration of the host computer 200 and the printer 300. The host computer 200 includes a CPU 201, a RAM 203, a ROM 205, a display device controller 207, a keyboard controller 209, a memory controller 211, a hard disk drive (HDD) 213, and a communication interface (I/F) 220. These constituent elements are connected to each other via a bus 230. The display device 215 is connected to the display device controller 207. A keyboard 217 is connected to the keyboard controller 209, and an external memory 219 is connected to the memory controller 211. The USB cable 120 is connected to the communication I/F 220. In this embodiment, the communication I/F 220 and a communication I/F 320, which will be mentioned later, employ the USB 2.0 standard. Accordingly, the USB cable 120 is a USB 2.0-compliant cable. The CPU 201 loads programs stored in the HDD 213 into the RAM 203 and executes those programs in order to control the overall operations of the host computer 200.

The printer 300 is a line printer that prints using four colors of ink, or cyan (C), magenta (M), yellow (Y), and black (K). The printer 300 includes a CPU 301, a RAM 303, a ROM 305, a printing unit interface (I/F) 307, a memory controller 309, an operation panel 313, and a communication interface (I/F) 320. These constituent elements are connected to each other via a bus 330. A printing unit 311 is connected to the printing unit I/F 307, and an external memory 315 is connected to the memory controller 309.

The CPU 301 loads programs stored in the ROM 305 into the RAM 303 and executes those programs in order to control the overall operations of the printer 300. The printing unit 311 is hardware, configured of such as an ink cartridge that holds ink, a print head, a platen, and the like for carrying out printing by ejecting ink onto a printing medium.

The operation panel 313 is a user interface for a user to make settings, instructions, and so on regarding printing. The "settings" are settings such as the type, size, and so on of the printing medium. The "instructions" are instructions for starting printing, stopping printing, and so on.

When forming dots upon the printing medium, the printer 300 uses three different sizes of dots, or large dots, medium dots, and small dots. Accordingly, eight bits, or two bits×four colors, are required for one pixel of dot data.

2. Host-Side Processing (FIG. 3)

Figure 3:
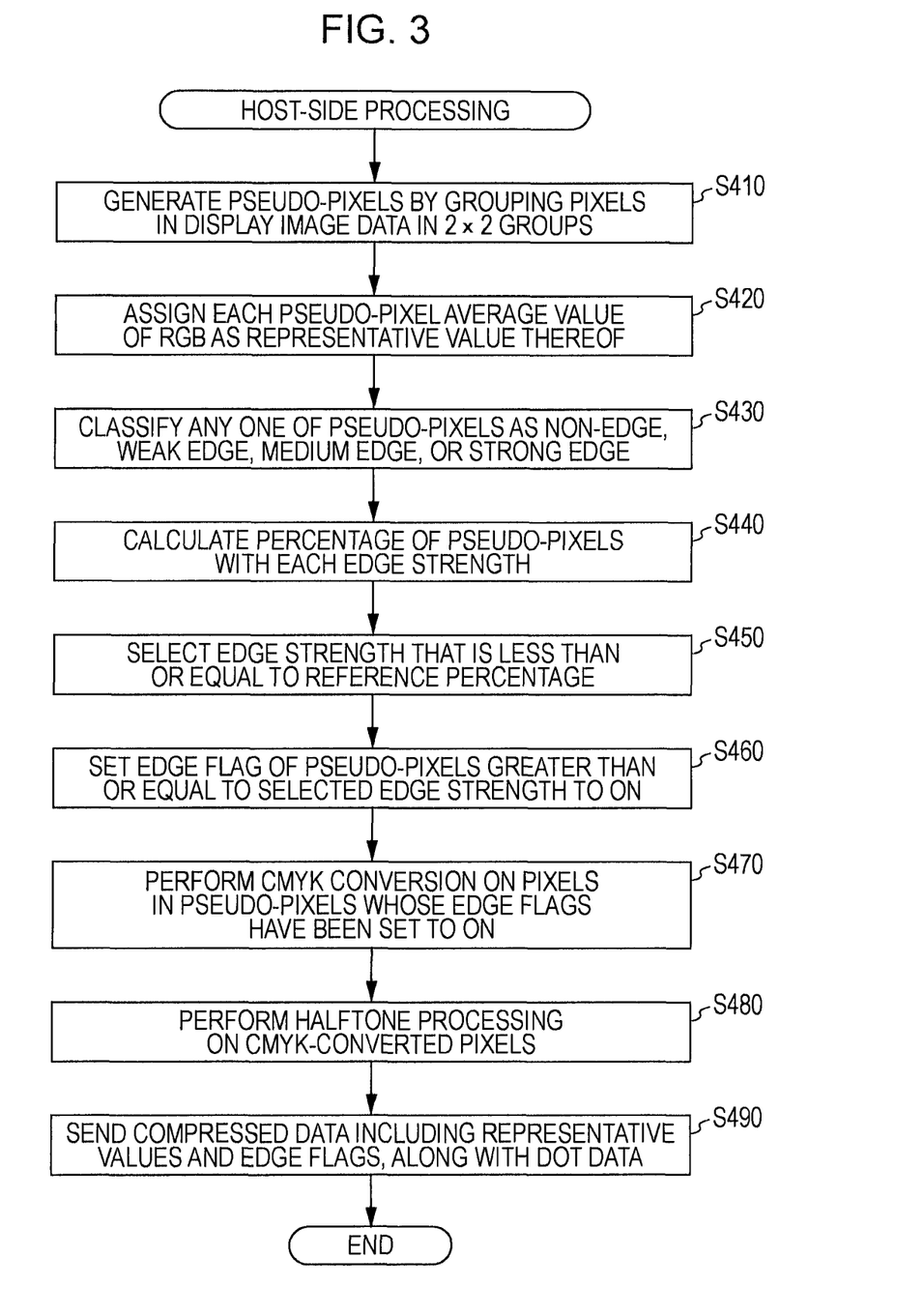
FIG. 3 is a flowchart illustrating host-side processing.

FIG. 3 is a flowchart illustrating host-side processing. The CPU 201 provided in the host computer 200 is the primary executor of the host-side processing. An instruction to print being inputted via the operation panel 313 serves as a trigger for starting the processing.

Figure 4:
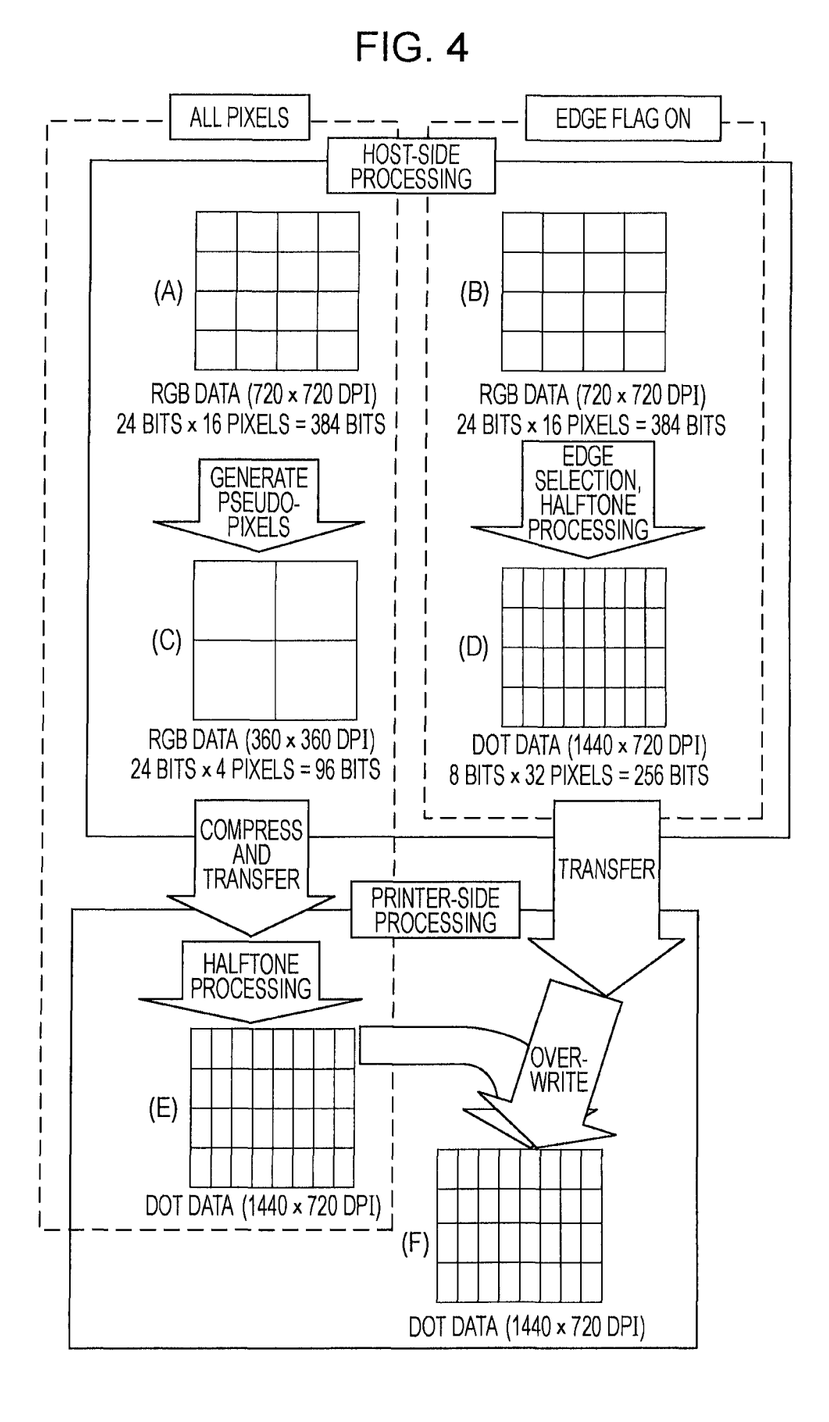
FIG. 4 illustrates data conversion.

FIG. 4 is a diagram illustrating data conversion carried out through the host-side processing and printer-side processing (mentioned later with reference to FIG. 5). (A) and (B) in FIG. 4 indicate 16 pixels, or four pixels×four pixels, serving as some of the many pixels that configure the display image data. The data amount of these 16 pixels is 384 bits, or eight bits×three primary colors×16 pixels.

When the host-side processing is started, the CPU 201 generates pseudo-pixels by grouping the pixels in the display image data into groups of four (step S410). A pseudo-pixel is configured of two pixels on the vertical×two pixels on the horizontal. (C) in FIG. 4 indicates four pseudo-pixels based on the 16 pixels. The resolution of a pseudo-pixel is thus 360×360 dpi.

Next, a representative value is assigned to each pseudo-pixel (step S420). The "representative value" is an average value of the RGB values of the pixels that belong to the pseudo-pixel. In other words, information of one color is assigned to a single pseudo-pixel. The data amount of the pseudo-pixel is 96 bits, or eight bits×three primary colors× four pixels, which is lower than the original 384 bits.

Next, each pseudo-pixel is classified as one of non-edge, weak edge, medium edge, and strong edge (step S430). Non-edge, weak edge, medium edge, and strong edge are segments indicating whether the RGB values of the four pixels that configure the pseudo-pixel are within respective predetermined ranges. The color among the three primary RGB colors having the maximum difference between a maximum value and a minimum value is used in the determination as to whether or not the value is within the predetermined range. Assuming 256 gradation values, a maximum difference of 0-16 is classified as non-edge, a maximum difference of 17-32 is classified as weak edge, a maximum difference of 33-64 is classified as medium edge, and a maximum difference of 65 or more is classified as strong edge.

Next, the percentage of pseudo-pixels with each edge strength is calculated (step S440). Then, for each of the edge strengths, the weakest of the edge strengths is selected among edge strengths whose integrated values are less than or equal to a reference percentage (step S450). This reference percentage is 10% in this embodiment. The "integrated value" is a value obtained by adding together the percentages of a given edge strength and the edge strengths that are greater than that given edge strength. Thus in the case of a weak edge, the integrated value is a value obtained by adding together the percentage of weak edges, the percentage of medium edges, and the percentage of strong edges. In the case of a strong edge, however, the integrated value is the percentage of strong edges itself. For example, in the case where only the integrated value of strong edges is less than or equal to 10%, the strong edge is selected. In the case where the integrated values of weak edges, medium edges, and strong edges is less than or equal to 10%, the weak edge is selected. Note that in the case where the integrated value of strong edges is greater than 10%, the strong edge is selected.

Note that the stated value of 10% is determined so that the transfer of the print image data does not become slower than the printing performed by the printer 300. Because an approximate data amount of the print image data when the integrated value is a given percent can be estimated, using an integrated value of 10% as an upper limit makes it possible to set an upper limit on the data amount of the print image data.

Meanwhile, the upper limit of the integrated value may be changed in accordance with the output image size. Generally speaking, there is leeway in terms of the processing speed, the transfer speed, and so on when the output image is small, which makes it possible to increase the upper limit value.

Next, an edge flag is set to ON for pseudo-pixels having an edge strength that is greater than or equal to the selected edge strength (step S460). The edge flag has an initial value of OFF. Then, CMYK conversion is executed on the pixels contained in the pseudo-pixels whose edge flags are ON (called "edge ON pseudo-pixels" hereinafter) (step S470). The CMYK conversion is executed by referring to a conversion LUT stored in the ROM 205 and performing interpolation processes as necessary.

Next, a halftone process is executed on the pixels that have undergone CMYK conversion (step S480). Dot data at a resolution of 1440×720 dpi, which is the resolution of the printer, is generated by this halftone process. Note that an error diffusion technique may be used in the halftone process, or a dithering technique may be used in the halftone process.

(D) in FIG. 4 indicates 32 pixels, serving as some of the many pixels that configure the dot data generated by the halftone process in step S480. The data amount of the 32 pixels' worth of dot data is 256 bits, or two bits×four colors× 32 pixels.

Next, the representative values and edge flags of all pseudo-pixels are compressed through Huffman coding and transferred to the printer 300, the dot data generated through the halftone process is transferred to the printer 300 (step S490), and the host-side processing ends. The aforementioned print image data is configured by these three types of data.

3. Printer-Side Processing (FIG. 5)

Figure 5:
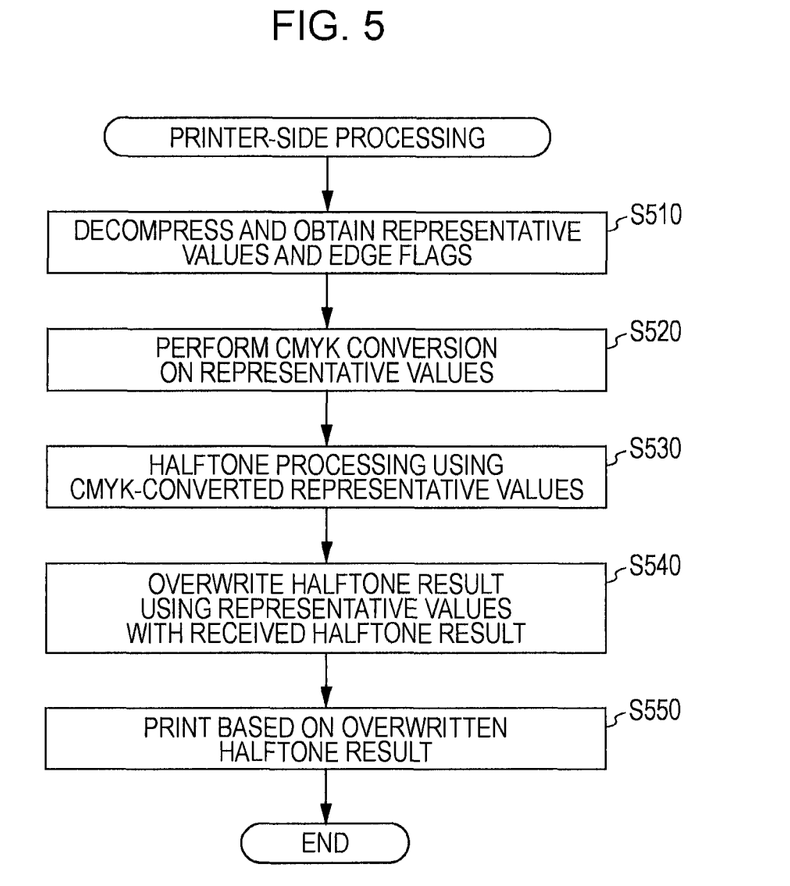
FIG. 5 is a flowchart illustrating a host halftone process.

FIG. 5 is a flowchart illustrating printer-side processing. The CPU 301 provided in the printer 300 is the primary executor of the printer-side processing. The transfer of the print image data from the host computer 200 serves as a trigger for starting the processing.

First, the representative values and edge flags are obtained by decompressing the transferred compressed data (step S510). Next, CMYK conversion is carried out on the representative values (step S520). This CMYK conversion is executed by referring to a conversion LUT stored in the ROM 305. This conversion LUT is the same as that stored in the ROM 205 of the host computer 200.

Next, a halftone process is executed using the representative values that have undergone the CMYK conversion (step S530). This halftone process may also use a dithering technique or an error diffusion technique. In the case where the host computer 200 and the printer 300 use the dithering technique, it is preferable for both devices to use the same dither mask. Using the same dither mask makes it possible to smooth the connections between the edge ON pseudo-pixels and pseudo-pixels for which the edge flag is OFF, thus making it easy to suppress the occurrence of pseudo-borders. It is preferable for the dither mask to be a blue noise mask, which uses a large mask having blue noise properties.

Dot data at a resolution of 1400×720 dpi is also generated by this halftone process. (E) in FIG. 4 indicates 32 pixels, serving as some of the many pixels that configure the dot data generated by the halftone process in step S530.

Next, the dot data generated based on the representative values is overwritten by the dot data transferred from the host computer 200 (step S540). This overwriting is carried out on pixels that configure the edge ON pseudo-pixels. (F) in FIG. 4 indicates 32 pixels, serving as some of the many pixels that configure the dot data generated by step S540.

Finally, printing is carried out based on the dot data generated as a result of the overwrite (step S550), and the printer-side processing ends.

4. Effects

According to the printing system 10, the time required to transfer the print image data from the host computer 200 to the printer 300 can be shortened. This is because the print image data according to this embodiment has a low data amount than dot data based on all of the pixels, RGB data, and so on.

As described earlier, the print image data is data in which the representative values and edge flags of all pseudo-pixels has been compressed and dot data of the pixels that configure the edge-ON pseudo-pixels. The data amount of the print image data depends on the percentage of the number of all pseudo-pixels occupied by edge ON pseudo-pixels. In other words, the lower that percentage is, the lower the data amount of the print image data will become. This is because the compression rate for the edge flags becomes higher when the number of pixels on which the dot data is based is reduced, so naturally, the data amount decreases. It is therefore not possible to say exactly how low the data amount of the print image data will become in this embodiment.

Accordingly, the printing system 10 achieves a favorable edge reproducibility while keeping the transferred data amount to within a predetermined value by segmenting the pseudo-pixels into four levels based on their edge strengths. Furthermore, data that meets such a condition can be generated by referring to each pseudo-pixel only once, and thus the processing burden on the host computer 200 is small.

Second Embodiment

Figure 6:
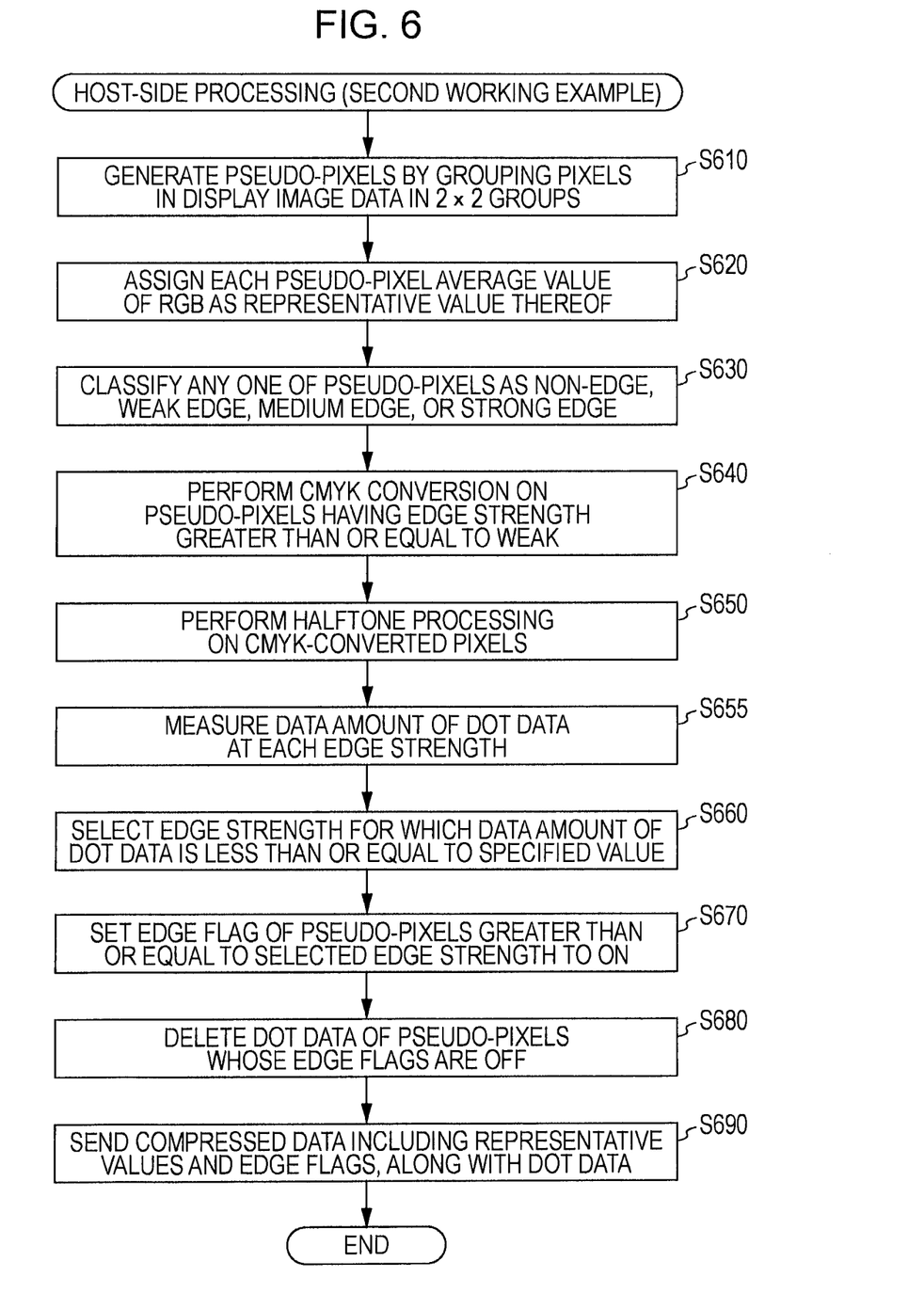
FIG. 6 is a flowchart illustrating printer-side processing.

5. Host-Side Processing (FIG. 6)

Descriptions of a second embodiment will be given based on points that differ from the first embodiment. The second embodiment differs from the first embodiment only in terms of the host-side processing. FIG. 6 is a flowchart illustrating host-side processing according to the second embodiment. Some of the host-side processing is the same in the first embodiment and the second embodiment. Specifically, step S610 to step S630 and step S690 in the second embodiment are the same as step S410 to step S430 and step 490 in the first embodiment, respectively. Accordingly, descriptions of the second embodiment will be started from step S640.

CMYK conversion is carried out on the pixels in pseudo-pixels, among the pseudo-pixels whose edge strengths have been classified in step S630, that have the edge strengths that are weak or greater (step S640). Next, a halftone process is executed on the pixels that have undergone CMYK conversion (step S650).

Then, the data amount of dot data that is based on the pixels contained in the pseudo-pixels of each edge strength is measured (step S655). Next, for each of the edge strengths, the weakest of the edge strengths is selected among edge strengths whose integrated values are less than or equal to 5 MB (step S660). This integrated value is a value obtained by adding the data amount of the pixels contained in pseudo-pixels of a given edge strength with the data amount of dot data based on the pixels contained in pseudo-pixels having a higher edge strength than the given edge strength. Thus in the case of a weak edge, this is a value obtained by adding together the data amounts of dot data based on the pixels contained in the pseudo-pixels having weak edges, medium edges, and strong edges. In the case of a strong edge, this is the value itself of the data amount of the dot data based on the pixels contained in the pseudo-pixels having strong edges. For example, in the case where only the integrated value of strong edges is less than or equal to 5 MB, the strong edge is selected. In the case where the integrated values of weak edges, medium edges, and strong edges is less than or equal to 5 MB, the weak edge is selected. Note that in the case where the integrated value of strong edges is greater than 5 MB, the strong edge is selected.

Next, an edge flag is set to ON for pixels contained in pseudo-pixels having an edge strength that is greater than or equal to the selected edge strength (step S670). Then, the dot data based on pixels whose edge flags are OFF is deleted (step S680). The dot data that was not deleted in step S680 becomes the dot data that is to be transferred in step S690.

6. Effects

An effect unique to the second embodiment is that because the edge strength is selected based on the data amount of the dot data, the edge strength can be selected after first accurately understanding the data amount of the dot data that is to be transferred.

7. Correspondence Relationships Between Embodiments and Application Examples Step S410 and step S610 correspond to software for realizing a pseudo-pixel generation unit; step S420 and step S620 correspond to software for realizing an assignment unit; step S430 and step S630 correspond to software for realizing an edge strength classification unit; steps S440 and S450 and step S660 correspond to software for realizing a lower limit strength selection unit; step S440 corresponds to software for realizing an estimation unit; step S450 corresponds to software for realizing a pre-selection unit; step S460 through step S480 and step S640 through step S655, step S670, and step S680 correspond to software for realizing a host halftone processing unit; step S490 and step S690 correspond to software for realizing a transfer unit; step S520 and step S530 correspond to software for realizing a printer halftone processing unit; step S540 and step S550 correspond to software for realizing a printing unit; step S640 and step S650 correspond to software for realizing a pre-selection halftone processing unit; step S655 corresponds to software for realizing a measurement unit; and step S670 and step S680 correspond to software for realizing a post selection unit.

8. Other Embodiments

The invention is not limited in any way to the aforementioned embodiments, and can be carried out in a variety of forms without departing from the technical scope of the invention. For example, constituent elements in the embodiments that are additional can be omitted from the embodiments. Here, "additional" constituent elements refer to elements that correspond to matter that are essentially independent and not specified in application examples. In addition, for example, the following embodiments may be employed.

The print image data may be for black-and-white printing. In such a case, the print image data expresses achromatic colors, and thus the data amount of the print image data is even lower.

The size of the pseudo-pixels (that is, how many pixels each pseudo-pixel contains) may be different from the aforementioned embodiments. However, it is preferable for the resolution of the pseudo-pixels to be lower than the resolution of the dot data, in order to reduce the data amount of the print image data. Of course, if the resolution of the pseudo-pixels is extremely low, the percentage of edge ON pseudo-pixels will increase, and it is thus thought that the data amount will not decrease. In light of such a situation, it is preferable to determine the size of the pseudo-pixels.

The definition of an "edge" may be different from that in the aforementioned embodiments. For example, the RGB values may be thought of as three-dimensional coordinate values, distances between compared colors may be found, and it may then be determined whether or not the distances are greater than or equal to a predetermined value.

The pixels contained in the edge ON pseudo-pixels may be excluded from the halftone processing performed by the printer 300. This is because those pixels are not used in the printing even if the halftone processing is executed thereon.

The halftone processing performed by the host computer 200 may be error diffusion that refers to a dithering result, whereas the halftone processing performed by the printer 300 may be executed as dither-compliant halftoning. By doing so, even if the two instances of dot data are combined, not only is there almost no discontinuity, but the reproducibility of halftone line images and the like is improved as well.

The representative value need not be an average value, and may be another statistical value, such as a maximum value, a minimum value, or the like. Alternatively, the representative value need not be a statistical value; for example, the value of an upper-left pixel may continually be employed as the representative value.

The transferred representative value may be a CMYK value. For example, after the host computer 200 determines an RGB-format representative value, CMYK conversion may be carried out on that representative value, or the representative value may be determined after performing CMYK conversion on the RGB values of the respective pixels. In such a case where CMYK conversion is performed on the RGB values of the respective pixels, the host computer 200 may carry out the edge judgment based on the CMYK values.

The numerical values described in the embodiments, such as the number of pixels contained in a pseudo-pixel, the values into which the edge strengths are segmented, the percentage that serves as the reference value for selecting edge strengths, and the data amounts, may be changed as appropriate.

The host computer 200 may execute the process for assigning the representative values and the process for generating the dot data in parallel.

With respect to the edge ON pseudo-pixels, the transfer of the representative values may be omitted.

The method of compression is not limited to Huffman coding, and may use run-length encoding.

The printer 300 may be a serial printer.

The entire disclosure of Japanese Patent Application No. 2011-262661, filed Nov. 30, 2011 is expressly incorporated by reference herein.

What is claimed is:

1. A printing system comprising a host device and a printer that executes printing using dot data indicating whether or not to form a dot for each pixel,
the host device including:
a pseudo-pixel generation unit that generates a pseudo-pixel by grouping together a plurality of pixels;
an edge strength classification unit that classifies the pseudo-pixel into one of a plurality of segments according to an edge strength of the pseudo-pixel;
a lower limit strength selection unit that selects a lower limit edge strength based on a result of the classification performed by the edge strength classification unit;
a host halftone processing unit that generates the dot data based on pixels contained in a pseudo-pixel having an edge strength greater than or equal to the lower limit edge strength selected by the lower limit strength selection unit;
an assignment unit that assigns, to a pseudo-pixel that is not to be processed by the host halftone processing unit, a representative value reflecting a color specification value of each pixel contained in that pseudo-pixel, a bit value of the representative value per the pseudo-pixel being greater than a bit value of the dot data for each of the pixels, and
a transfer unit that transfers, to the printer, the representative value assigned by the assignment unit and the dot data generated by the host halftone processing unit, and
the printer including:
a printer halftone processing unit that generates the dot data by executing a halftone process on the representative value transferred from the host device; and
a printing unit that executes printing based on the dot data generated by the printer halftone processing unit and the dot data transferred from the host device.

2. The printing system according to claim 1,
wherein the lower limit strength selection unit has:
an estimation unit that estimates, for each of the plurality of segments, a data amount of the dot data generated based on the pixels contained in a pseudo-pixel having an edge strength greater than or equal to the lower limit of the segments; and
a pre-selection unit that selects, as the lower limit edge strength, a lower limit strength of the segment having the highest data amount among the plurality of segments whose estimated data amounts are less than or equal to a predetermined amount.

3. The printing system according to claim 2,
wherein the estimation unit carries out the estimation based on the percentage of the number of all pseudo-pixels occupied by the pseudo-pixels of the respective plurality of segments.

4. The printing system according to claim 2,
wherein in the case where the data amount of the dot data is not less than or equal to the predetermined amount even when the segment among the plurality of segments that has the strongest lower limit strength is selected, the pre-selection unit selects dot data that is based on the pixels contained in the pseudo-pixels of a segment having the strongest lower limit strength.

5. The printing system according to claim 1,
wherein the host halftone processing unit has:
a pre-selection halftone processing unit that generates the dot data by executing a halftone process on the pixels contained in pseudo-pixels containing an edge;

a measurement unit that measures, for each of the plurality of segments, a data amount of the dot data generated based on the pixels contained in pseudo-pixels having an edge strength greater than or equal to the lower limit of the segments; and a post selection unit that selects the dot data based on the pixels contained in the pseudo-pixels have edge strengths greater than or equal to the lower limit edge strength as the dot data to be transferred by the transfer unit, and the lower limit strength selection unit selects, as the lower limit edge strength, a lower limit strength of the segment having the highest data amount among the plurality of segments whose measured number of pseudo-pixels is less than or equal to a predetermined amount.

6. The printing system according to claim 5, wherein in the case where the data amount of the dot data is not less than or equal to the predetermined amount even when the segment among the plurality of segments that has the strongest lower limit strength is selected, the post selection unit selects dot data that is based on the pixels contained in the pseudo-pixels of a segment having the strongest lower limit strength.

7. The printing system according to claim 1, wherein the representative value is an average value of RGB values of the pixels that belong to the pseudo-pixel, and the transfer unit transfers the average value and the dot data to the printer.

* * * * *